Aug. 14, 1934.　　　　J. FITZPATRICK　　　　1,969,739
METHOD OF REFORMING LASTS
Filed July 26, 1933　　6 Sheets-Sheet 1
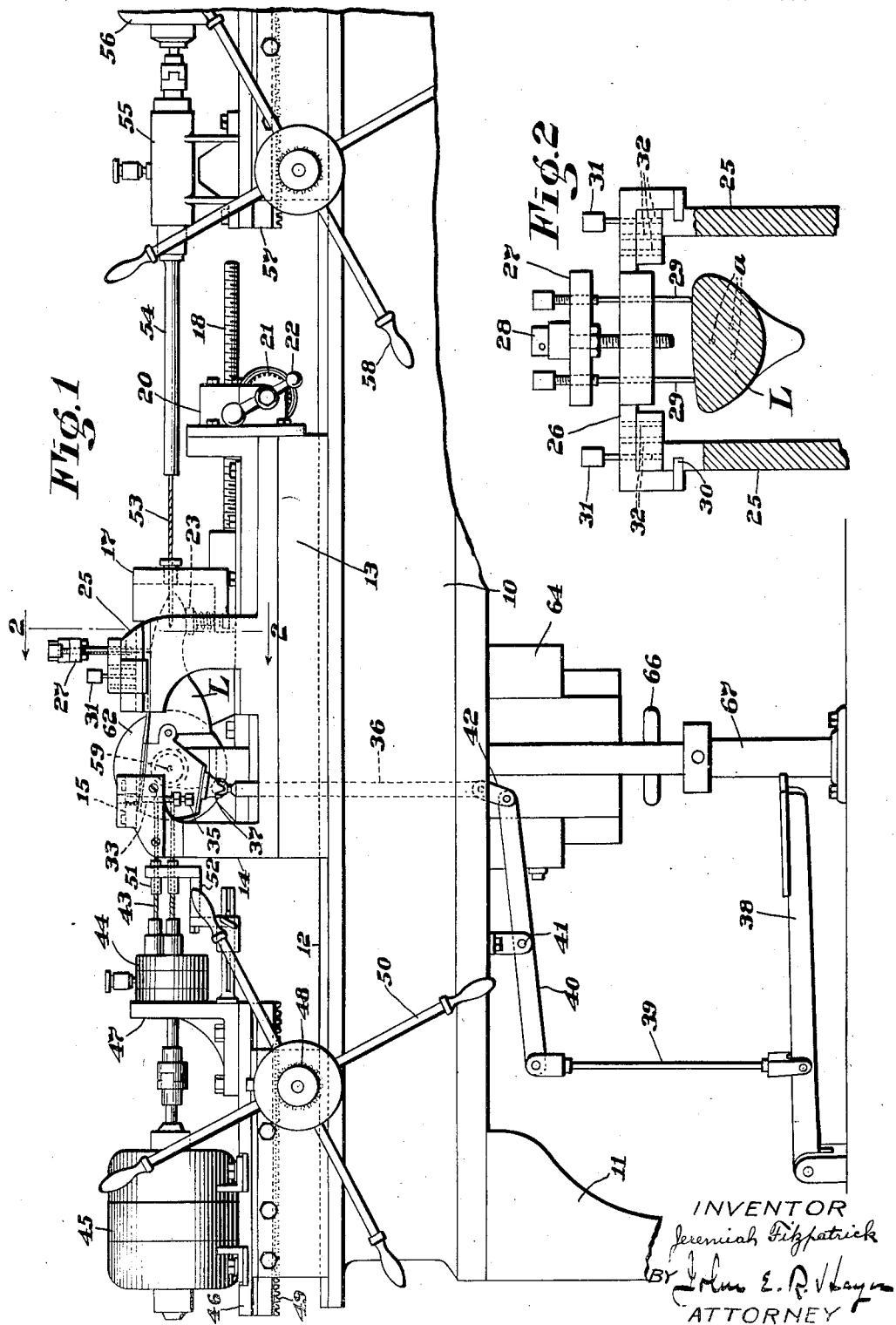

Aug. 14, 1934.    J. FITZPATRICK    1,969,739
METHOD OF REFORMING LASTS
Filed July 26, 1933    6 Sheets-Sheet 2
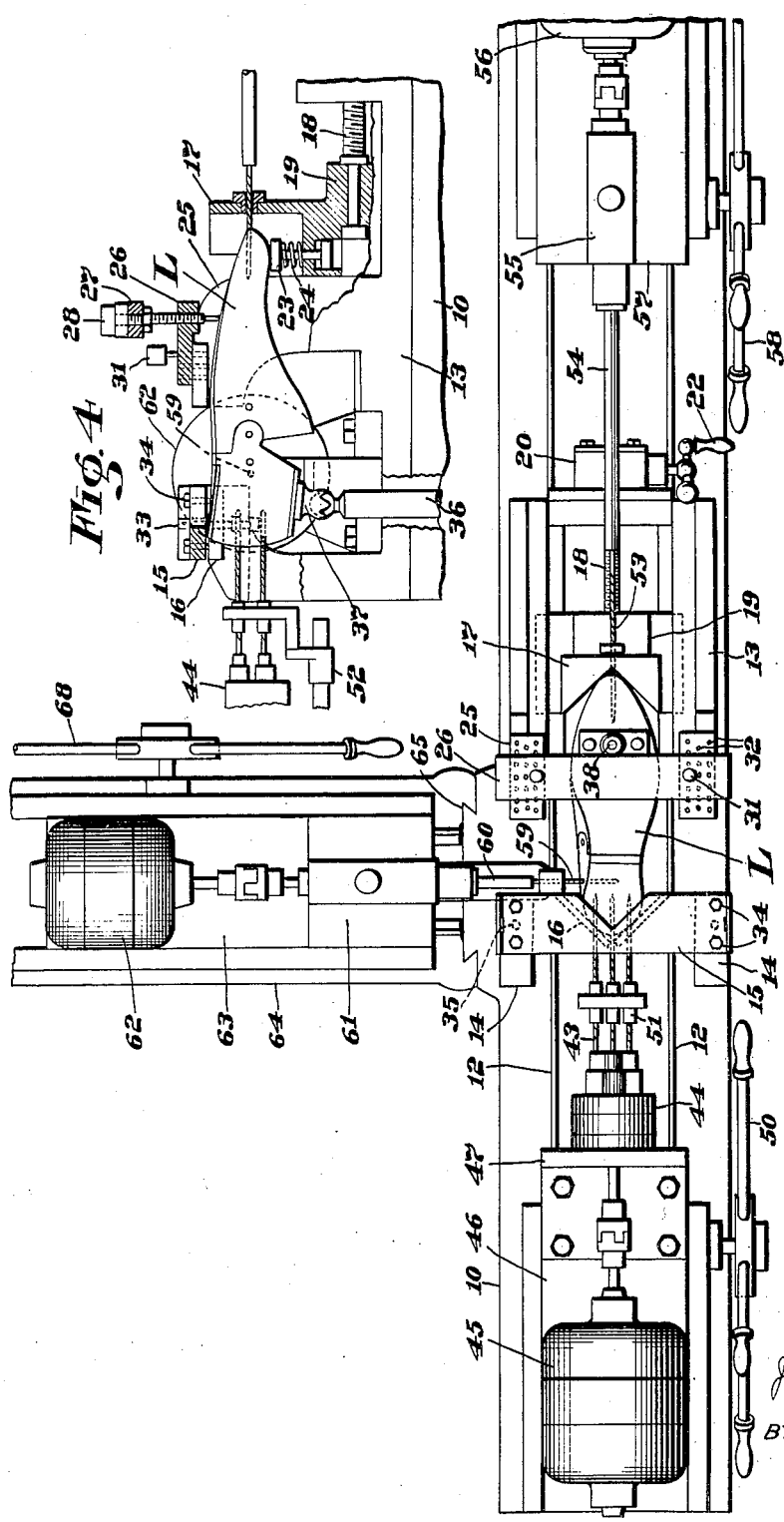
INVENTOR:
Jeremiah Fitzpatrick
BY John E. R. Hayes
ATTORNEY

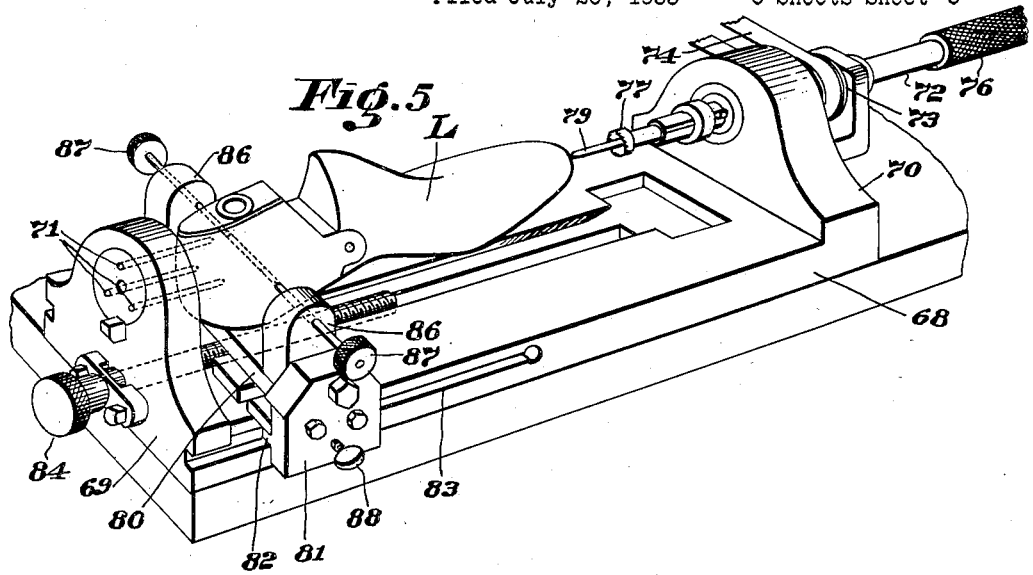

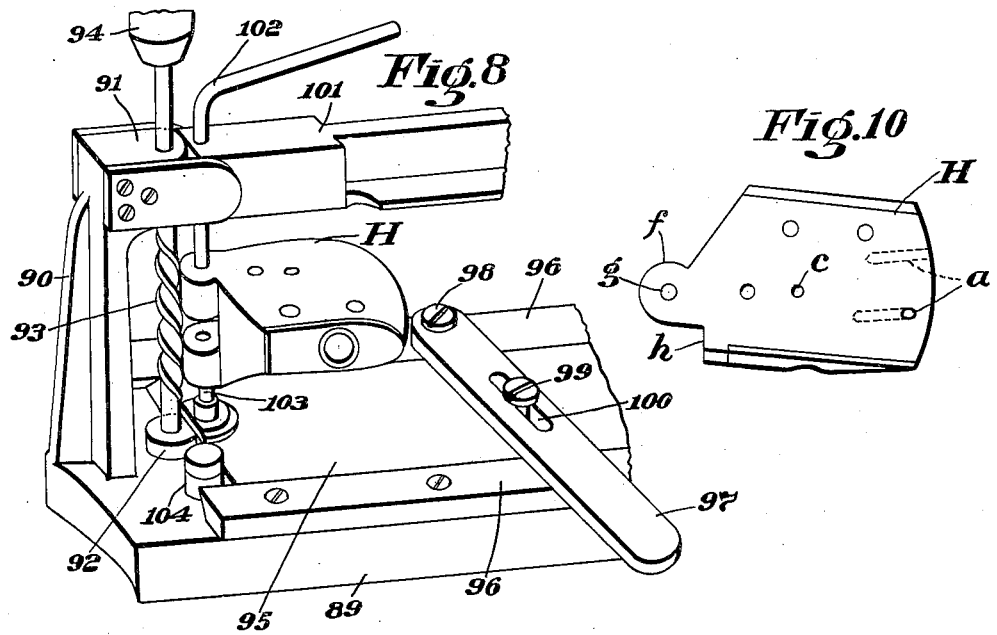
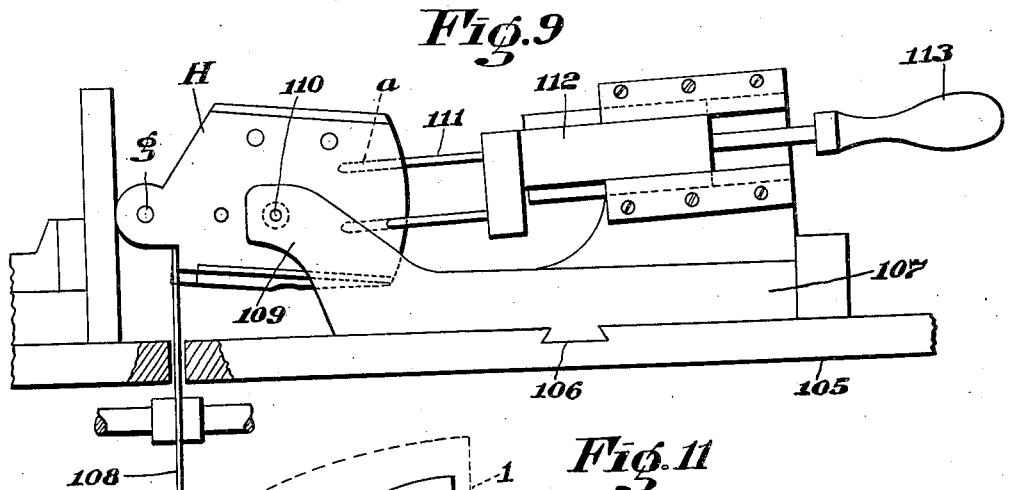
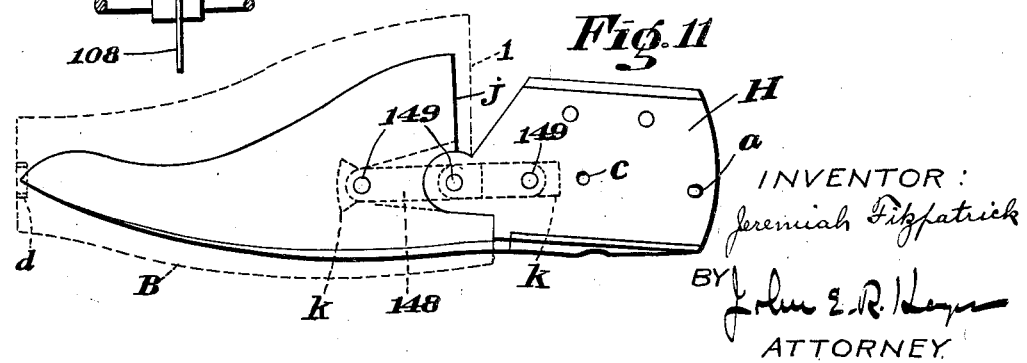

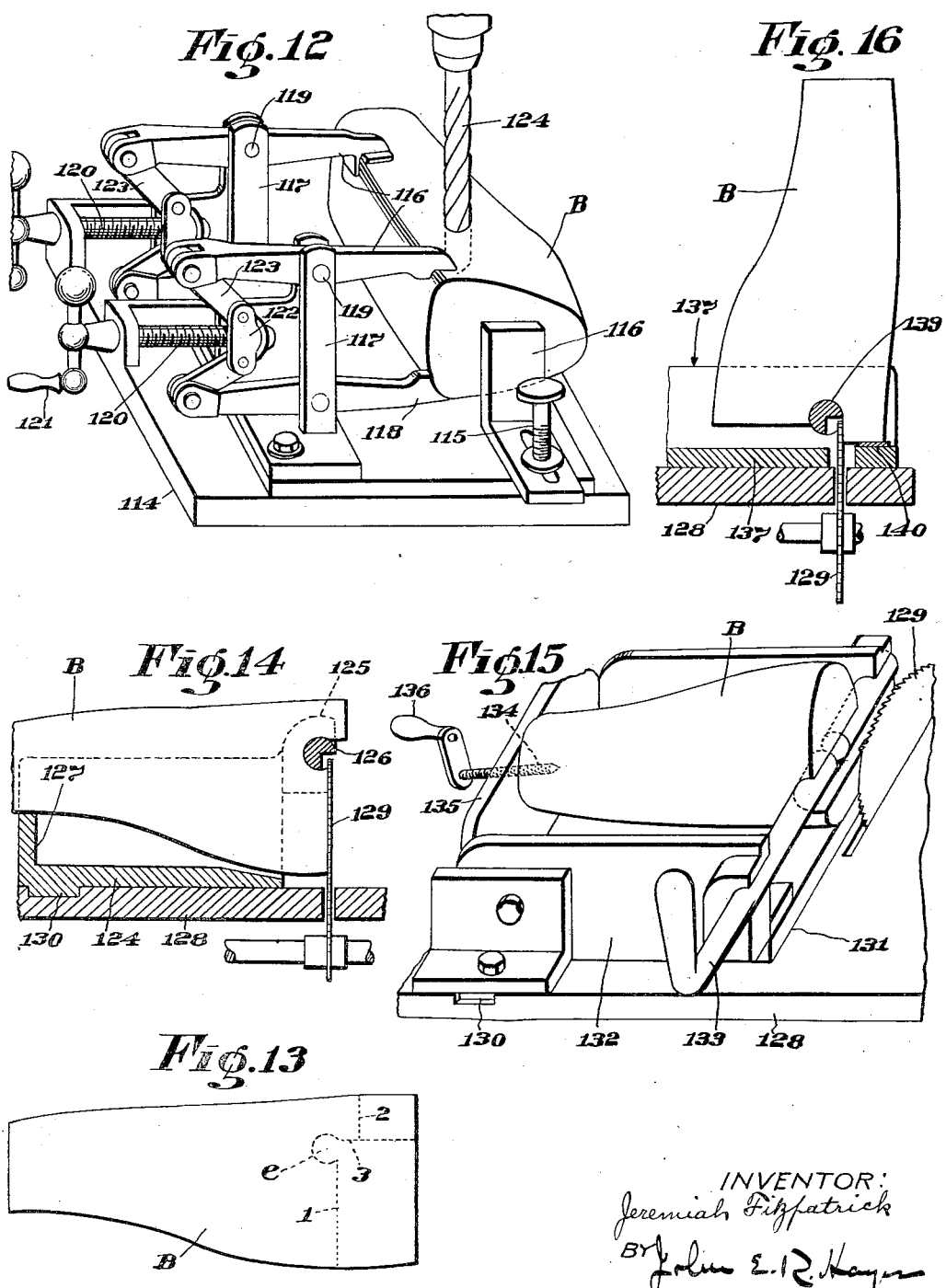

Aug. 14, 1934.  J. FITZPATRICK  1,969,739
METHOD OF REFORMING LASTS
Filed July 26, 1933    6 Sheets-Sheet 6
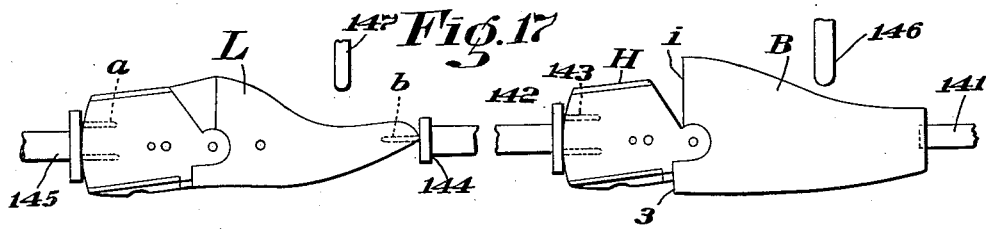
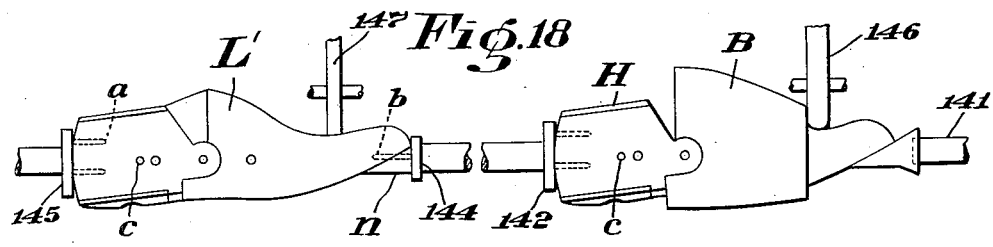
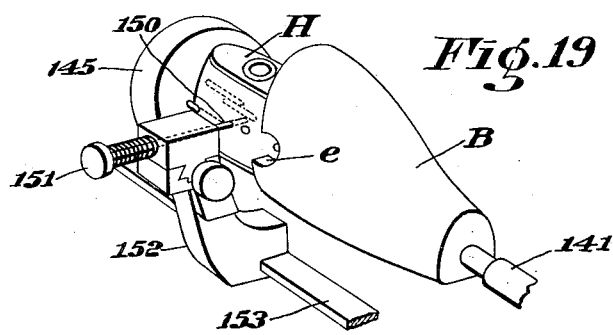
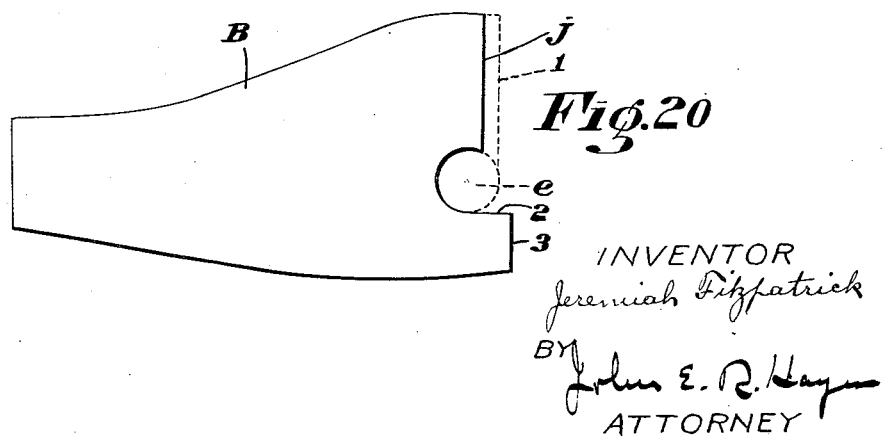
INVENTOR
Jeremiah Fitzpatrick
BY
John E. R. Hayes
ATTORNEY Patented Aug. 14, 1934

1,969,739

UNITED STATES PATENT OFFICE 1,969,739

METHOD OF REFORMING LASTS

Jeremiah Fitzpatrick, East Weymouth, Mass.

Application July 26, 1933, Serial No. 682,264

19 Claims. (Cl. 144—309)

This invention relates to a method of reforming old lasts, or lasts that have been used, in conformity with a new or different model.

In order to reform old lasts it is important to accurately position each of the lasts to be reformed with respect to the model last so that the axis of the old last and model last are similarly supported during the cutting operation. The difficulty of accomplishing this is increased, at least in part, by the fact that old lasts do not maintain the shape originally given to them due to swelling and shrinkage caused by weather conditions.

If the lasts to be reformed possess sufficient stock to permit the desired configuration to be given to the last by cutting away part of the original wood, then no additional wood stock is needed. If there is not sufficient stock upon the last to be reformed to permit the desired configuration to be produced by a turning operation then it may be necessary to cut away the toe of the last where additional stock is needed and secure a new piece of wood or block thereto that is large enough to allow the desired turning operation. Should a pronounced change in the fore part of the last be required, then it may be desirable to remove the entire hinged fore part of the last from the heel part and substitute a new fore block.

It is therefore an object of the present invention to provide a method whereby each of the lasts to be reformed will be positioned and supported during the cutting operation in a precise and proper relation to the model last; in other words, to provide a method whereby the last to be reformed will be subjected to a cutting operation with relation to an axis which is like the axis of the model last. Especially is it an object to provide a method whereby these ends may be secured in connection with the second and third conditions above mentioned in which the toe end of the last to be reformed, or its entire fore part, is removed and replaced by a block.

One important feature of the invention resides in the step of defining an axis in each last and like axes for all the lasts by forming longitudinal and transverse borings therein.

Another feature resides in the step of supporting the last from these borings so as to accurately position the last for toe boring operations.

Another feature of the invention pertains particularly to hinge lasts and resides in the method of forming the co-operating hinge elements of the toe part and heel part of the last so that the connection between these parts is sufficiently rigid to permit the hinge last to be cut to the desired configuration in a last turning lathe; also to improving the hinge connections.

A still further feature of the invention resides in the step of supporting a hinge last in a last turning lathe so that it cannot buckle while the turning centre is being forced into engagement with the last.

Other features of the method of the present invention and mechanism for carrying out the different steps of the method will be hereinafter described in connection with the accompanying drawings wherein:

Fig. 1 is a side elevation of a lining up and drilling machine for use in carrying out the present invention.

Fig. 2 is a sectional view taken on the line 2—2 of Fig. 1.

Fig. 3 is a top plan view of Fig. 1.

Fig. 4 is a longitudinal sectional view through the last supporting mechanism of Fig. 3.

Fig. 5 is a perspective view of a testing and centre boring machine provided with a model last.

Fig. 6 is a longitudinal sectional view of the machine of Fig. 5 provided with a last having its forward end portion replaced by a block of wood.

Fig. 7 is a view similar to Fig. 6 but shows a last having the entire hinged fore part replaced with a fore block.

Fig. 8 is a perspective view of mechanism for shaping the cylindrical hinge element of the heel part of the last.

Fig. 9 is a side elevation of mechanism for squaring up a shoulder upon said heel part.

Fig. 10 is a side elevation of the heel part of a last.

Fig. 11 is a side elevation of a reformed hinged last, the block from which the fore part of the last is formed being shown in dotted lines.

Fig. 12 is a perspective view of mechanism for supporting a toe or fore block in position to be drilled transversely.

Fig. 13 is a side view of a toe or fore block provided with dotted lines showing how the block may be cut to form the hinge.

Fig. 14 is a vertical sectional view of a jig for supporting the fore block for one cutting operation.

Fig. 15 is a perspective view of a jig for supporting this block for a second cutting operation.

Fig. 16 is a sectional view of a jig for supporting this block for a third cutting operation.

Fig. 17 is a diagrammatic view showing a model last and last to be reformed mounted in their operative relation upon a last turning lathe.

Fig. 18 is a view similar to Fig. 17 but shows the model last as having its axis of rotation disposed below the intersection of the toe surfaces.

Fig. 19 is a perspective view of mechanism adapted to engage the side bore of a hinged last to prevent the last from buckling on the last turning lathe; and Fig. 20 is a side view of a fore block which has been cut to form the hinge elements that connect it to the heel portion of the last.

In practicing the method of the present invention in reforming lasts it is found desirable to work in so far as possible from the axis of the original last; that is, from the axis upon which the last was originally turned, since by turning the last as it is reformed upon this original axis proper alignment of the reformed toe part with the axis of the old heel part is assured.

While as above stated the present invention contemplates the reformation of lasts under each of the three conditions above mentioned, the disclosure herein has been directed more particularly to the third condition in which the last to be reformed is provided with an entire new hinged fore part.

In the drawings the lining up and drilling machine shown in Figs. 1 to 4 inclusive, is used primarily to form borings in the rear end and side of the heel part of the last, but may also be employed to bore the toe of the last. The machine shown in Figs. 5, 6 and 7 is designed primarily to form a centre bore in the forward end of a toe block, but may be employed also as a testing machine to make sure that the transverse or side bore is properly located with respect to the longitudinal axis of the last. The machines shown in Figs. 8 to 16, inclusive, relate to the shaping of the male and female elements of the hinge of the last, and the machines shown in Figs. 17, 18 and 19 pertain to the last turning operations.

Considering first the lining up and drilling machine shown in Figs. 1 to 4 inclusive, this machine is provided with a bed plate 10 which may be supported at the desired height from the floor by legs 11 and the upper face of this bed plate is provided with the longitudinal extending ribs or guideways 12. Mounted upon the bed plate 10 near the central portion thereof is a jig or last supporting device 13 and this jig is preferably slidably mounted upon the guideways 12 for movement longitudinally of the bed plate relative to a side drill to be described, and is adapted to be clamped by means, (not shown) in the desired position. The jig or last supporting device 13 is adapted to support a last L with its tread up as shown and is constructed to centre the toe and heel of the last with respect to drills to be described.

In the construction shown the jig or last supporting device is provided with the uprights 14 which serve to support the heel positioning bar 15 in spaced relation to the base of the jig as shown. The arrangement is such that the metal plate which is usually secured to the tread of the heel of a last, may engage the lower face of the positioning bar 15. It is important to centre the last with relation to its longitudinal axis and to facilitate this the under face of the bar 15 is provided with the V-blocks 16 adapted to engage the opposite side of the heel of the last to centre this end of the last.

In order to centre the toe portion of the last the jig 13 has slidably mounted thereupon the V-shaped block 17, the V portion of which is adapted to engage the toe as shown in Fig. 3. The V-block 17 may be moved towards and from the toe of the last by the threaded shaft 18, that is rigidly or non-rotatably secured to the base portion 19 of the block 17. The shaft 18 is provided with a threaded sleeve rotatably mounted within a housing 20 secured at one end of the jig. This sleeve may be rotated to adjust the shaft by a gear 21 which is manually rotated by the crank handle 22. The block 17 is provided with a yielding toe support 23 which may have the form of a headed pin slidably mounted for vertical movement in the base block 19 and this pin is urged upwardly by the coil spring 24 as will be apparent from Fig. 4.

It is desirable to line up the last L so that the ball portion of its tread will lie in a horizontal plane and this is accomplished in the construction shown by providing the jig 13 with the laterally spaced uprights 25 which are adapted to support the bridge bar 26 in elevated relation to the base of the jig. Upon this bridge bar is adjustably mounted a transverse bar 27 which may be adjusted vertically with respect to the bridge bar 26 by operating the adjusting bolt 28. The transversely extending bar 27 is provided with downwardly extending pins 29 which have threaded engagement with the bar 27 for vertical adjustment therein. These pins are adapted to engage the ball of the last as best shown in Fig. 2, and may be adjusted to cause this portion of the last to lie in a horizontal plane.

Since it may be desirable to drill different size lasts in the jig 13 the parts thereof are made adjustable to accommodate lasts of various shapes and sizes, and to this end the bridge bar 26 is mounted upon the supporting uprights 25 for adjustment longitudinal of the lasts, and to facilitate this the downwardly extending end portions of the bar 26 are provided with the inwardly projecting ribs 30 which extend into slots formed in the outer faces of the uprights 25 and serve to form a sliding connection between the bridge bar 26 and uprights 25. After the bridge bar 26 has been adjusted longitudinally of the jig to a position to accommodate the particular size last to be drilled, it may be secured in this position of adjustment by inserting pins 31 through holes formed in the bridge bar 26 so that they enter the properly positioned holes 32 formed in the upper ends of the uprights 25. To facilitate the adjustment just mentioned graduations may be provided upon an outer face of the uprights 25 corresponding to the size of the lasts to be drilled to thereby indicate in which holes the positioning pins 31 should be inserted to accommodate this particular size last.

Should it be desirable to raise or lower the heel of the last with respect to the drills to be described for forming bores in the heel, this may be facilitated by mounting the heel positioning plate 15 for vertical adjustment, and to this end the plate 15 is slidably connected to the uprights 14 by the keys 33 and the desired adjustment of the bridge plate 15 is secured by operating the adjusting bolts 34 and 35.

After the last L has been placed in the jig 13 and the toe engaging block 17 is moved into engagement with the toe of the last by operating the crank handle 22, the last may be firmly held with its heel plate against the lower face of the bar 15 by a foot operated plunger 36, the upper end of which plunger is provided with a pivotally mounted head 37 that engages the heel portion of the last as shown. Upward movement of the plunger 36 is effected by exerting downward pressure upon the foot treadle 38 which is connected by the link 39 to an operating lever 40. The intermediate portion of this lever is pivotally connected at 41 to the machine frame and its end is connected by the link 42 to the lower end of the plunger 36.

In order to support the heel of the lasts in the subsequent operations to be described, it is found desirable to form three drill holes or bores $a$ in the rear end of the heel and positioned so that they are equally spaced in so far as possible from the longitudinal axis about which the last was originally turned. The bores $a$ are formed by the drills 43 which are driven by gears or the like within the chuck 44 and the operating mechanism within the chuck 44 may be driven by the electric motor 45. The motor 45 is mounted upon a sliding base plate 46 and the chuck 44 is secured to a bracket 47 which is bolted to the base plate 46. The arrangement is such that the drills 43 and their supporting and driving mechanism may be moved towards and from the last by gear mechanism 48 adapted to engage a rack 49 secured to the base plate 46, and the gear 48 may be rotated by the hand levers 50. The drills 43 are shown as provided with guiding sleeves 51 which are supported by a bracket 52 adjustably mounted upon the bracket 47.

A single drill hole or bore $b$ may be formed in the toe of the model last to support it during the last turning operations and this drill hole may be formed by a drill 53 mounted in the operating shaft 54, which shaft is journaled in a supporting bracket 55 and is driven by an electric motor 56. The motor 56 and bracket 55 are secured to a sliding base plate 57 supported by the bed plate 10 of the machine for movement longitudinally of the bed plate and the base plate 57 may be operated to move the drill 53 toward and from the work by the hand levers 58.

One of the features of the present invention resides in a last positioning bore $c$ formed transversely of the last, and in the construction shown this transverse bore is formed by a drill 59 supported by the operating shaft 60 which is journaled in the supporting bracket 61 and the shaft 60 is driven by an electric motor 62. The bracket 61 and motor 62 are mounted upon a base plate 63, which is supported by a bracket 64 for sliding movement at right angles to the longitudinal axis of the bed plate 10. It is desirable to support the drill 59 so that it will lie in a horizontal plane passing through the axis of the drill 53 and a centre point located at equal distance from the axes of the three drills 43. To facilitate the vertical adjustment of the drill 59 so that it will lie in the plane just mentioned, the supporting bracket 64 is preferably attached to the bed plate 10 by the dovetail construction 65 for vertical sliding movement. The bracket 64 may be raised or lowered by operating a hand wheel 66 which may rotate an adjusting screw (not shown) but supported by the post 67. Movement of the drill 59 towards and from the lasts may be secured by rotating the hand levers 68, which wheel operates a gear and rack similar to the gear 48 and rack 49 above described.

Having described the construction of the lining up and drilling machine shown in Figs. 1 to 4 inclusive, the manner in which this machine may be used in carrying out the method of the present invention will now be described. The last which is to be provided with the last positioning bores $a$ and $c$, or $a$, $b$ and $c$, is placed in the jig 13 so that the heel of the last engages the V-blocks 16 and the metal plate upon the heel rests against the under face of the bar 15. While the last is in this position the positioning pins 29 are adjusted, one relative to the other, so that the tread of the last lies in a horizontal plane. These positioning pins 29 are then raised and lowered by operating the nut 28 to position the toe of the last which rests upon the yielding support 23 so that the intersection of the toe surfaces will lie in the horizontal plane of the drill 53. The last may be held in this position during the drilling operation by the pressure of the machine attendant's foot upon the foot treadle 38 to operate the plunger 36. After the side drill 59 has been adjusted vertically to the horizontal plane of the drill 53, the drills 43, 53 and 59 may be moved towards the work by their respective hand levers to drill the bores $a$, $b$ and $c$, or $a$ and $c$, if the bore in the toe of the last is not desired at this time. These bores are preferably so formed in the last that the longitudinal axis which they define will be approximately the axis upon which the last was originally turned.

Assuming that the last L which has just been bored in the manner described is the last which is to be remodeled by hand in order to form the model last having the configuration which is to be imparted to the entire lot of lasts to be reformed, then the last L with the bores $a$ and $c$ therein may be turned over to the workman who will remodel the last by hand, to give it the desired configuration. After this is done it is desirable to form a bore in the toe of the remodeled last which will lie upon the axis defined by the borings $a$ and $c$, and to accomplish this the remodeled last is placed in the centre boring and testing machine of Fig. 5 which will now be described.

The machine disclosed in Fig. 5 is provided with a base plate 68 which may be secured to a worktable or other suitable support. The base plate 68 is provided at its opposite ends with the upstanding plates 69 and 70. The end plate 69 has rigidly mounted therein the three last positioning pins 71 adapted to fit snugly in the three last positioning holes $a$ formed in the heel of the last. The end plate 70 of the testing device has rotatively mounted therein the cutter operating spindle 72 which is driven by a pulley 73 and belt 74. The spindle 72 is supported by its bearings for sliding movement in the direction of its length and is provided with a longitudinal slot 75 adapted to receive a driving key secured to the pulley 73. The outer end of the spindle 72 may be provided with a handle 76 so that it may be conveniently moved by hand towards and from the work. The spindle 72 is provided at its inner end with a circular cutter 77 which is adapted to cut a circular ring in the end of a toe block, to be described, to receive a dead or supporting centre of a last turning lathe. The cutter 77 is preferably provided with a centre bore 78 adapted to receive a centre pin 79 which may be inserted in this bore and removed therefrom by hand. The bore 78 is also adapted to receive a twist drill which may be secured therein by a set screw (not shown).

The base plate 68 of the testing machine is provided with the transversely extended bridge bar 80 which is slidably supported for adjustment lengthwise of the testing machine, and to this end the end plates 81 of the bridge bar are provided with keys 82 adapted to enter slots 83 formed in the opposite sides of the base plate. The arrangement is such that the bridge bar 80 may be adjusted lengthwise of the base plate 68 to the desired position by operating the adjusting screw 84 which engages a threaded sleeve or nut 85 secured to the bar 80. The bridge bar 80 has projecting upwardly therefrom the posts 86, two being shown in the present construction but one post may be sufficient, depending upon whether the transversely extending bore $c$ is formed in one or both sides of the last. Each post 86 is provided with a transversely extending bore which is positioned to lie in the horizontal plane defined by the longitudinal axis of the spindle 72 and the centre point common to the three pins 71. The bores in the posts 86 are adapted to receive the last positioning pins 87 which project from these posts into the bore $c$ of the last.

The construction just described is such that the last L which it is assumed has been remodeled by hand, or any other last which has been provided with the last positioning bores $a$ and $c$, may be supported entirely from the heel portion of the last to thereby accurately position the toe portion of the last ready to be provided with either a centre bore or drill hole in the toe of the last.

While the remodeled last L is supported entirely from its heel part as shown in Fig. 5, a bore $b$ may be accurately formed in the toe of the last by inserting a twist drill such as above mentioned in the bore 78 of the cutter 77 and then advancing the rotating shaft 72 by hand towards the toe of the last to drill the desired bore $b$. The centre pin 79 may be used to test the proper location of the side bore $c$ as hereinafter described.

It is desirable that the transversely extending bore $c$ shall be positioned as near the toe portion of the last as other conditions will permit since the greater the distance this bore is from the heel end of the last the more accurately it will act to position the last. However, this bore must be so positioned that it will not strike the metal parts commonly provided in hinged lasts to operatively connect the heel and toe portions of the last. To meet this condition the jig 13 as above pointed out is slidably mounted upon the bed plate for adjustment lengthwise of the bed plate relative to the transverse drill 59, and the bridge plate 80 of the testing machine is likewise adjustable longitudinally of the base plate of the testing machine so that the pins 87 may be properly aligned with the transverse bore $c$. After the bridge bar 80 has been adjusted to its proper longitudinal position it may be secured in this position by tightening up the locking screws 88.

In reforming lasts it may be desirable in some cases to cut away certain portions of the forward end or toe of the lasts and replace the removed portion with a block of wood which is large enough to facilitate the desired reforming of the last. This construction is illustrated in Fig. 6 in which the last to be reformed has the heel part B and toe part T, and the end of the toe, it should be noted, has been removed, and the block of wood E has been secured to the part T in place thereof. In reforming this type of last the original last may be placed in the lining up and drilling machine of Fig. 1 in the manner above described so that it may be drilled to form the last positioning bores $a$ and $c$. After these bores have been formed in the heel portion H of the last, then the forward end of the last may be cut away and replaced by the block E after which the last may be placed in the testing machine as shown in Fig. 6 so that the last is entirely supported from its heel portion by the pins 71 and 87. When the last is thus supported its toe block E will be properly positioned with respect to the circular cutter 77 so that if this cutter is rotated and moved by hand into engagement with the outer end of the block E it will form a centre bore lying on the axis defined by the borings $a$ and $c$.

If it is desired to make substantial changes in the shape of the lasts to be reformed then it may be desirable to remove the entire fore part of the last and substitute therefor a fore block B as shown in Fig. 7. In this case each last to be reformed, before any changes have been made therein, is placed in the drilling machine of Fig. 1 and is provided with the last positioning bores $a$ and $c$. The entire hinged fore part of the last is then removed and the fore block B is secured to the heel part H in place thereof as shown in Fig. 7. The last with the large rough fore block B attached thereto is mounted upon the pins 71 and 87 as shown in Fig. 7 so that the last is entirely supported from the heel part H, whereupon the desired centre bore $d$ is cut in the forward end of the block B by the circular cutter 77, and this centre bore will be positioned at the axis defined by the borings $a$ and $c$.

The bores $a$ and $b$ formed in the opposite ends of the model last L, and the bores $a$ formed in the heel of the last and the centering bore $d$ formed in the toe block of the last, are provided for the purpose of properly centering the model last and last to be reformed in the last turning lathe as will be apparent from Fig. 17.

While the transverse bore $c$ has been described as formed in the heel portion, this location of the transverse bore is necessary only in case the last to be reformed is a hinged last and the entire hinged fore part of the last is to be reformed. If only the toe end portion of the last is to be removed as shown in Fig. 6 while the major portion of the toe block T is retained, then the transverse bore $c$ might be formed in the part T of the last instead of in the heel part H.

In order to successfully carry out the method of the present invention to reform hinged lasts it is necessary that a rigid connection between the heel and toe portion of the last be provided during the last turning operation, and one important feature of the present invention as above pointed out, resides in the construction of the hinge forming elements of the toe and heel portions of the last whereby a rigid connection is provided during the last turning operations. The manner in which this rigid connection is formed will now be described.

After the heel portion H of the last to be reformed has been provided with the desired heel positioning bores $a$ and $c$ then the entire hinged fore part of the last is removed. Since the last which is to be reformed may have been used for a long period of time the hinged portions thereof may have become warped or battered out of shape more or less, and it is therefore desirable to recut the hinge forming elements of the heel portion of the lasts so as to accurately shape them. The heel portion H of the last is shown as having the cylindrical shaped hinge element $f$ and this hinge element may be accurately cut to the desired cylindrical shape upon a machine such as shown in Fig. 8. This machine is provided with a base plate 89 and has extending upwardly therefrom the upright 90, and journaled in a laterally extending portion 91 of the upright 90 and in a bearing 92 of the base plate is the rotating spiral cutter 93 which may be driven by a drill chuck 94. Upon the base plate 89 is slidably mounted the last supporting plate 95 which is guided in its longitudinal sliding movement by the side bars 96. The plate 95 may be moved towards and from the cutter 93 by a hand operated lever 97, one end of which is pivotally secured at 98 to the machine base 89 and an intermediate portion of this lever is connected to the sliding plate 95 by a pin 99 extending through the elongated slot 100 formed in the lever 97.

Rigidly secured to the sliding plate 95 is the overhanging arm 101, only part of which is shown in the drawings. This arm is adapted to support the heel positioning pin 102, and the sliding plate 95 is provided with a similar pin 103. The arrangement is such that when the portion f of the last is to be dressed or re-shaped on the cutting machine of Fig. 8, the heel portion H is mounted upon the sliding plate 95 by introducing the pins 102 and 103 in the central hinged bore g so that the entire heel H may be swung in the arc of a circle about the pins 102 and 103 as an axis. If this is done while the work is adjacent the rotating cutter 93 it is apparent that the portion f of the last will be cut accurately to a cylindrical portion of the desired diameter. The movement of the work towards the cutter 93 is limited by a stop 104 adapted to be engaged by the forward edge of the sliding plate 95.

The heel portion H of the last shown is provided with a shoulder h and it is important that this shoulder be accurately formed. Means is therefore shown in Fig. 9 for dressing this shoulder so as to remove sufficient wood therefrom to true up the same and cause it to lie the proper distance from the centre of the hinge hole g. In order to accurately true up this shoulder h the heel portion H of the last is preferably supported from the heel positioning bores a and c. To this end the work supporting table 105 of the ordinary circular sawing machine is provided with a work guiding slot or other work guiding means 106 which is adapted to guide the sliding movement of a jig 107 as this jig is slid along the surface of the work supporting table 105 relative to the circular saw 108. The jig 107 is shown as having the projecting ears 109 adapted to receive the heel positioning pins 110 which are inserted in the transverse bore c of the heel portion of the last. The rear end of the portion H of the last is supported by the heel positioning pins 111 which are secured to a slide 112 supported by the jig 107 for movement by a handle 113 into and out of engagement with the bores a. After the pins 110 and 111 of the jig 107 have been inserted in the heel portion H of the last to support it in the position shown in Fig. 9, the shoulder h may be accurately cut to the desired size by sliding the jig 107 past the rotating saw while it is guided by a key in the guiding slot 106.

The operations just described serve to accurately shape the hinge elements of the heel portion H of the last, and mechanism for properly shaping the hinge elements of the fore block so that it may be attached to the heel portion of the last will now be described.

The new fore portion of the last is formed from a block of wood B of sufficient size to permit the desired turning and cutting operations and the first step contemplated by the present method in shaping the block B is to form a drill hole e transversely of the block of a size to snugly receive the portion f of the heel part of the last.

In order to drill the block B so that the hole e will lie at right angles to the longitudinal axis of the block, the block is conveniently supported in a horizontal position by the mechanism shown in Fig. 12, and which consists of a base plate 114 to which is adjustably secured by a bolt 115 a stop or angle plate 116. The base plate 114 is provided with the uprights 117 and each of these uprights is provided with a pair of work engaging fingers or clamps 118. The intermediate portion of each clamp is pivotally secured to its upright by a pivot pin 119. The clamps 118 are adapted to engage the upper and lower sides of the horizontal extending block B and each pair of clamps is moved into the work engaging position by a threaded shaft 120 which is rotated by a crank handle 121, and upon each shaft 120 is provided a traveling nut 122. This nut is connected to the upper and lower clamps by the links 123, the arrangement being such that rotation of either crank handle will move its clamps simultaneously towards or from the work B. It will be seen from the construction just described that a block of wood B may be quickly gripped by the clamps 118 with the end of the block B against the stop 116 so as to hold this block in position to be bored by the drill 124 to form the hinge hole e.

After the bore e is formed in the block B it is used to position the block during subsequent cutting operations. Further formation of the hinge is produced by making the saw cuts indicated by the dotted lines 1, 2 and 3 in Fig. 13. Each of these cuts may be accurately formed by providing jigs adapted to support the block B from the bore e for each cutting operation.

Cut 1 does not need to be formed with a high degree of accuracy since this surface of the last is further cut away in the finished last. To form this cut the block B may be mounted in a jig 124 such as shown in Fig. 14 and having the bored portions 125 adapted to receive the block positioning pins 126 that project from each side of the jig into the bore e of the block. The opposite end portion of the block may rest upon a shoulder 127 of the jig. This jig may be placed upon the table 128 of a sawing machine having the revolving circular saw 129 and as the jig is moved along the top of the table to advance the work past the saw it is guided by a key 130 entering a guide slot in the table.

Cut 2 may be formed by placing the block B in the jig 131 of Fig. 15 having the side walls 132 which are provided with pin supporting bores adapted to receive the block supporting pins 133. The rear end of the block B may be supported by the centre pin 134 having threaded engagement with a rear wall 135 of the jig and adapted to be rotated by the crank handle 136 to engage the centre pin with a centre hole in the end of the block B. The jig with the block B mounted therein in the manner just described is slid along the saw table 128 to cause the saw 129 to accurately form the cut 2. This cut preferably lies at right angles to the longitudinal axis of the reformed last. Cut 3 may be formed by employing the jig 137 of Fig. 16 having the side plates 138 adapted to receive the block positioning pins 139, the arrangement being such that the face 2 of the block rests upon a plate 140 during this cutting operation.

After the cuts indicated by e, 1, 2 and 3 in Fig. 13 have been made, the block B of this figure, and heel portion H of Fig. 10 which has had its surfaces $f$ and $h$ dressed are ready to be assembled. This is accomplished by sliding the hinge element $f$ in the bore $e$ by exerting a substantial pressure upon one of these last parts in the direction of the axis of the hinge bore $g$. The construction is such, it should be noted, that the bore $e$ snugly embraces the cylindrical portion $f$ through more than half of a circle, with the result that the parts H and B of the last are firmly and rigidly connected by the wooden hinge elements, as will be apparent from the construction of the block B shown in dotted lines in Fig. 11.

After the parts H and B have been assembled as shown in Fig. 11 the last is placed upon the testing machine as shown in Fig. 7 so as to form the centre bore $d$ in the end of the block B. The last is then ready to be reformed upon a last turning lathe such as indicated in Fig. 17, the last to be reformed being supported by the lathe dead centre 141 and the lathe turning head 142 provided with the pins 143 that extend into the bores $a$ of the last. The model last L is similarly supported in the last turning lathe by the dead centre 144 having a pin entering the bore $b$ and by the lathe turning head 145. Both lasts are rotated at the same speed by mechanism not shown, and a rapidly rotating cutter 146 acts upon the last portion B to be reformed while this cutter is controlled by a model following wheel 147 engaging the model L. As a result the last to be reformed will be accurately cut to conform to the model last L and is given the full line configuration of Fig. 11.

It is no longer necessary to maintain a rigid hinge connection between the toe and heel portions of the last after the completion of the lathe turning operation. The portion $l$ of the last of Fig. 11 may therefore be cut away to form the wall $j$ and thereby permit rocking movement between the hinge parts, and the toe and heel parts of the last may be provided with the hinge receiving slots $k$ adapted to receive a metal hinge 148 of any preferred or well known construction and which is secured in place by the pins 149. By constructing the hinge parts $e$ and $f$ in the manner just described a very accurate hinge is provided.

It will be seen from the foregoing that after the lining up and drilling machine has been properly adjusted to support one last of a lot to be reformed so that its axis is aligned with the toe drill 53 and centre of the three drills 43, and the side drill 59 has been adjusted to the horizontal plane of this axis, then the entire lot of lasts may be accurately drilled in this machine without changing its setting. It will also be seen that when these lasts are transferred to the testing and centre boring machine of Fig. 5 the pins 71 and 87 will support the heel of the last with its axis accurately aligned with the centre cutter 77.

In this manner the centre hole $b$ or annular bore $d$ is so formed in the toe end of the last or in the toe block that it lies in alignment with the axis of the heel last. As a result the model last L and last to be reformed are both rotated upon the lathe of Fig. 17 about like axes, and the axis upon which the block B is turned will align accurately with the axis of the heel part H.

It may be that when the model last is reformed by hand, the intersections of the toe surfaces will lie above the determined axis. This condition is shown by the last L' in Fig. 18 wherein a block of wood $n$ has been secured to the tread of the last to receive the center hole $b$. In this case however each last will be rotated about the determined axis of the heel part as in Fig. 17.

In placing the hinge last H, B in the lathe ready for the turning operation, the transverse bore $c$ may be utilized to prevent possibility of the last buckling at this time under the end pressure of the dead centre 141. After the centre has been forced against the work and is clamped in this position the rigid hinge connection between the parts H and B will prevent movement therebetween. The means shown for preventing possibility of the buckling just mentioned consists of a pin 150 having a head 151 and adapted to be inserted in the side bore $c$ of the last. This pin is supported by a bracket 152 mounted upon a bar 153 of the last turning lathe. After the last has been properly positioned in the lathe the pin 150 is retracted out of engagement with the last so that the last may be rotated.

Should it be desired to test the machine of Fig. 1 to see if the drill 59 has been properly adjusted to the horizontal plane defined by the other drills, this may be done by placing a last in this machine and drilling the bores $a$ and $b$. The last is then placed in the testing machine of Fig. 5 so that it is supported from its ends by the pins 71 and 79 entering the bores $a$ and $b$. When the last is thus supported the place where the side bore $c$ is to be formed may be indicated by inserting a pin 87 so that its pointed end will form a mark where the hole $c$ should be formed.

In the claims the term "fore block" has been used to indicate the last construction of Fig. 6 in which part of the toe portion has been replaced by the block E, and also the construction of Fig. 7 in which the entire hinged fore part has been replaced by the block B.

Having thus fully described my invention, I claim and desire to secure by Letters Patent of the United States:

1. The method of reforming lasts which comprises fixedly supporting each of the lasts in a determinate position and while thus supported forming like borings therein which define like axes for all the lasts, shaping by hand the fore part of one of the lasts to form a model last, supporting the model last in a determinate axial position by positioning elements engaging the borings therein and while thus supported forming a positioning centre in the fore end of said model last, replacing with a fore block the fore part of each of the other lasts to be reformed, supporting in a determinate axial position each of the lasts to be reformed by positioning elements engaging the borings therein and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

2. The method of reforming lasts to accord with a model last which comprises fixedly supporting each of the lasts to be reformed in a determinate position and while thus supported forming like borings therein which define like axes for all the lasts, forming like borings in the model last for defining the axis thereof, supporting the model last in a determinate axial position by positioning elements engaging the borings therein and while thus supported forming a positioning centre in the fore end of said model last, replacing with a fore block the fore part of each of the other lasts to be reformed, supporting in a determinate axial position each of the lasts to be reformed by positioning elements engaging the borings therein and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

3. The method of reforming lasts which comprises fixedly supporting each of the lasts in a determinate position and while thus supported forming like borings therein which define like axes for all the lasts, shaping by hand the fore part of one of the lasts to form a model last, forming a turning centre in the fore end of said model last on the axis as defined by the borings in it, replacing with a fore block the fore part of each of the other lasts to be reformed, forming a positioning centre in the fore end of the fore block of each last to be reformed lying on the axis as defined by the borings in it, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

4. The method of reforming lasts to accord with a model last which comprises fixedly supporting each of the lasts to be reformed in a determinate position and while thus supported forming like borings therein which define like axes for all the lasts, forming like borings in the model last for defining the axis thereof, forming a turning centre in the fore end of the model last on the axis as defined by the borings in it, replacing with a fore block the fore part of each of the other lasts to be reformed, forming a positioning centre in the fore end of the fore block of each last to be reformed lying on the axis as defined by the boring in it, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

5. The method of reforming lasts to accord with a model last which comprises fixedly supporting each of the lasts to be reformed in a determinate position and while thus supported forming like borings therein which define like axes for all the lasts and which axes are like the axis of said model last, replacing with a fore block the fore part of each of the lasts to be reformed, supporting in a determinate axial position each of the lasts to be reformed by positioning elements engaging the borings therein and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

6. The method of reforming hinged lasts to accord with a model last which comprises fixedly supporting each of the lasts to be reformed in a determinate position and while thus supported forming therein like borings which define like axes for all the lasts and which axes are like the axis of the model last, replacing with a fore block the fore part of each of the lasts to be reformed, forming a positioning centre in the fore end of the fore block of each last to be reformed lying on the axis as defined by the borings therein, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

7. As a preliminary operation for preparing lasts to be reformed the steps which comprise boring longitudinal and transverse holes in the lasts while each is similarly positioned to locate an axis within each last and which axes are alike for all the lasts and with relation to which the lasts are to be reformed, replacing with a new fore block the fore part of each of the lasts to be reformed, and supporting in a determinate position each of the lasts to be reformed by positioning elements engaging the longitudinal and transverse borings therein and while thus supported forming a positioning centre in the fore end of its new fore block.

8. The method of reforming hinged lasts which comprises fixedly supporting each of the lasts in a determinate position and while thus supported forming like borings in the heel part thereof which define like axes for all the lasts, shaping by hand the fore part of one of the lasts to form a model last, supporting the model last in a determinate axial position by positioning elements engaging the borings in the heel part thereof and while thus supported forming a positioning centre in the fore end of said model last, replacing with a fore block the entire hinged fore part of each of the other lasts to be reformed supporting in a determinate axial position each of the lasts to be reformed by positioning elements engaging the borings in the heel part thereof and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

9. The method of reforming hinged lasts to accord with a model last which comprises fixedly supporting each of the lasts to be reformed in a determinate position and while thus supported forming like borings in the heel part of each of the lasts which define like axes for all the lasts, forming like borings in the heel part of the model last for defining the axis thereof, supporting the model last in a determinate axial position by positioning elements engaging the borings therein and while thus supported forming a positioning centre in the fore end of said model last, replacing with a fore block the entire hinged fore part of each of the other lasts to be reformed, supporting in a determinate axial position each of the lasts to be reformed by positioning elements engaging the borings in the heel part thereof and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

10. The method of reforming hinged lasts which comprises fixedly supporting each of the lasts in a determinate position and while thus supported forming like borings in the heel part of each of the lasts which define like axes for all the lasts, shaping by hand the fore part of one of the lasts to form a model last, forming a turning centre in the fore end of said model last on the axis as defined by the borings in the heel part thereof, replacing with a fore block the entire hinged fore part of each of the other lasts to be reformed, forming a positioning centre in the fore end of the fore block of each last to be reformed lying on the axis as defined by the borings in the heel part thereof, setting up the model last and in turn each of the lasts to be reformed with supporting elements engaging certain of the borings therein whereby the lasts will be arranged preparatory to cutting in determinate axial positions, and cutting the lasts to be reformed to conform to the model.

11. The method of reforming hinged lasts to accord with a model last which comprises fixedly supporting each of the lasts to be reformed in a determinate position and while thus supported forming like borings in the heel part of each of the lasts which define like axes for all the lasts, forming like borings in the heel part of the model last for defining the axis thereof, forming a turning centre in the fore end of the model last on the axis as defined by the borings in the heel part thereof, replacing with a fore block the entire hinged fore part of each of the other lasts to be reformed, forming a positioning centre in the fore end of the fore block of each last to be reformed lying on the axis as defined by the boring in the heel part thereof, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

12. The method of reforming hinged lasts to accord with a model last which comprises fixedly supporting each of the lasts to be reformed in a determinate position and while thus supported forming like borings in the heel part of each of the lasts which define like axes for all the lasts and which axes are like the axis of said model last, replacing with a fore block the entire hinged fore part of each of the lasts to be reformed, supporting in a determinate axial position each of the lasts to be reformed by positioning elements engaging the borings in the heel part thereof and while thus supported forming a positioning centre in the fore end of its fore block, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

13. The method of reforming hinged lasts to accord with a model last which comprises fixedly supporting each of the lasts to be reformed in a determinate position and while thus supported forming like borings in the heel part of each of the lasts which define like axes for all the lasts and which axes are like the axis of the model last, replacing with a force block the entire hinged fore part of each of the lasts to be reformed, forming a positioning centre in the fore end of the fore block of each last to be reformed lying on the axis as defined by the borings in the heel part thereof, setting up the model last and in turn each of the lasts to be reformed with supporting elements engaging certain of the borings therein whereby the lasts will be arranged preparatory to cutting in determinate axial positions, and cutting the lasts to be reformed to conform to the model last.

14. The method of reforming hinge lasts which comprises locating in the heel part of the last the axis upon which the reformed last is to be turned, replacing the entire hinged fore part of the last with a fore block, placing the assembled heel part and fore block in a last turning lathe so as to turn about said axis, and cutting said block to conform to a model in said lathe.

15. The method of reforming hinge lasts which comprises locating in the heel part of the last by longitudinal and transverse borings therein the axis upon which the reformed last is to be turned, replacing the entire hinged fore part of the last with a fore block, supporting the last by positioning elements engaging the borings in the heel part thereof and while thus supported forming a positioning centre in the fore end of its fore block lying within said axis, placing the last in a last turning lathe to turn about said axis, and cutting said block to conform to a model in said lathe.

16. The method of reforming hinge lasts which comprises the steps of removing the entire hinged fore part of the last, reforming the surface of the hinge element of the heel part to a cylindrical surface, forming by boring a complementary hinge element in a fore block and assembling the heel part and block with the cylindrical element of the heel part fitting snugly within the boring in said block.

17. The method of reforming hinge lasts which comprises the steps of locating in the heel part of the last an axis, removing the entire hinged fore part of the last, reforming the surface of the hinge element of the heel part to a cylindrical surface, forming on the front face of the heel part an edge adjacent said cylindrical surface and lying at substantially right angles to said axis, forming by boring a complementary hinge element in a fore block, forming an edge on the rear face of said fore block adapted to have abutting engagement with said edge on the heel part when the heel part and block are assembled, and assembling the heel part and block with the cylindrical element of the heel part fitting snugly within the boring in said block.

18. The method of reforming hinge lasts which comprises the steps of removing the entire hinged fore part of the last, reforming the surface of the hinge element of the heel part to a cylindrical surface having a peripheral extension larger than a half circle, forming by boring a complementary hinge element adjacent the rear edge of the fore block having a surface extension larger than a half circle, assembling the heel part and block with the cylindrical element of the heel part fitting snugly within the boring in said block, and removing by cutting a rear edge portion of the block whereby the surface extension of the boring therein will not exceed a half circle.

19. The method of reforming hinge lasts which comprises the steps of providing the heel part of the last with borings including a transverse boring for locating the axis upon which the reformed last is to be turned, replacing the entire hinged fore part of the last with a block, forming a positioning centre in the fore end of said block in line with the axis of the heel part thereof, placing the assembled parts in a lathe between lathe engaging elements and with a holding pin extending into said transverse boring in the heel part, securely gripping the work by relative adjustment of said lathe engaging elements, withdrawing the holding pin from the transverse boring and then rotating the work and cutting in the usual manner.

JEREMIAH FITZPATRICK.